United States Patent
Sullam et al.

(10) Patent No.: US 6,614,320 B1
(45) Date of Patent: Sep. 2, 2003

(54) SYSTEM AND METHOD OF PROVIDING A PROGRAMMABLE CLOCK ARCHITECTURE FOR AN ADVANCED MICROCONTROLLER

(75) Inventors: Bert Sullam, Bellevue, WA (US); Harold Kutz, Snoquolmie, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 10/000,383

(22) Filed: Oct. 24, 2001

Related U.S. Application Data

(60) Provisional application No. 60/243,708, filed on Oct. 26, 2000.

(51) Int. Cl.$^7$ .......................... H03B 28/00; G06F 1/06; G06F 1/08; G06F 1/10
(52) U.S. Cl. ........................ 331/46; 331/74; 713/501
(58) Field of Search ............................ 331/46, 49, 74, 331/158; 327/296; 713/500, 501

(56) References Cited

U.S. PATENT DOCUMENTS

| | | | |
|---|---|---|---|
| 5,202,687 A | 4/1993 | Distinti | 341/158 |
| 5,258,760 A | 11/1993 | Moody et al. | 341/166 |
| 5,414,308 A | 5/1995 | Lee et al. | 327/293 |
| 5,563,526 A | 10/1996 | Hastings et al. | 326/37 |
| 5,600,262 A | 2/1997 | Kolze | 326/38 |
| 5,754,081 A * | 5/1998 | Kuroiwa et al. | 331/49 |
| 6,144,327 A | 11/2000 | Distinti et al. | 341/126 |
| 6,166,367 A | 12/2000 | Cho | 250/208.1 |
| 6,225,866 B1 | 5/2001 | Kubota et al. | 330/295 |

OTHER PUBLICATIONS

CYPR–CD00175; "Method for Synchronizing and Resetting Clock Signals Supplied to Multiple Programmable Analog Blocks (As Amended)"; Oct. 1, 2001; 09/969,311; B. Sullam.

CYPR–CD00190; "Method and Cicruit for Allowing A Microprocessor To Change Its Operating Frequency On–The–Fly"; 09/826,397; Apr. 2, 2001; B. Sullam.

\* cited by examiner

Primary Examiner—David C. Mis
(74) Attorney, Agent, or Firm—Wagner, Murabito, & Hao LLP

(57) ABSTRACT

One embodiment of the present invention is a programmable clock architecture for a microcontroller that provides multiple different clocking signal frequencies that may be utilized by one or more programmable logic blocks of the microcontroller. In this manner, the clocking architecture enables the programmable logic blocks to perform a wider variety of functions because they have access to a wider variety of clock signal frequencies. Specifically, the clocking architecture of the present embodiment includes a plurality of clocking sources. For example, the output clocking signal of one of the clock oscillators is divided down to different smaller frequencies and also multiplied to provide more frequencies that may be utilized by the programmable circuit blocks and processor of the microcontroller. Additionally, the clocking architecture includes a programmable option of utilizing precision clocking signals and/or less precise clocking signals depending on the desired applications of the microcontroller's programmable circuit blocks.

29 Claims, 3 Drawing Sheets

SYSTEM AND METHOD OF PROVIDING A PROGRAMMABLE CLOCK ARCHITECTURE FOR AN ADVANCED MICROCONTROLLER

CROSS REFERENCE TO RELATED APPLICATION

This application claims priority to the copending U.S. provisional patent application Ser. No. 60/243,708 entitled "Advanced Programmable Microcontroller Device" by Snyder et al., filed Oct. 26, 2000, attorney docket number CYPR-CD00167.

TECHNICAL FIELD

The present invention generally relates to the field of microcontrollers. More particularly, the present invention relates to the field of clocking architecture utilized within microcontrollers.

BACKGROUND ART

Modern research and technology have provided society with a wide variety of different devices. It is appreciated that some of these modern devices are very powerful and useful to their users. For example, some of the modem devices that fall into this category include: computers which occupy large office space down to computers which are held in one's hand, satellites which orbit around earth relaying a multitude of communication signals, global positioning system (GPS) devices capable of determining the specific locations of their users on the earth, microwave ovens capable of quickly cooking food, cellular phones which enable their users to communicate wirelessly with other people, to name a few. Additionally, it should be appreciated that some modern devices also provide entertainment to their users. For instance, some of the modern devices which fall into this category include: portable and fixed televisions which provide a wide variety of visual and audio programming to their users, video cassette recorders (VCRs) which enable their users to record television shows for later viewing and also enable them to watch (for example) prerecorded movies on a television set, portable and fixed radio receivers which provide their users music along with a wide array of different audio programming, video game consoles which challenge their users with varying situations within different virtual realities, and portable and fixed compact disc (CD) players which provide music to their users.

One of the enabling components of several of the above mentioned modern devices is a microcontroller or MCU. Specifically, the microcontroller is typically defined as a single chip (integrated circuit) that includes a processor, volatile memory such as Random Access Memory (RAM), non-volatile memory such as Read Only Memory (ROM), clocking source, and an input/output control unit. As such, the microcontroller is a computer on a chip. It should be appreciated that microcontrollers have been utilized in various applications for many years. Primarily, microcontrollers are used in control-oriented applications that are interrupt-driven, sensing and controlling external events. Microcontrollers are frequently found in a wide variety of devices and applications.

For example, microcontrollers may be found in appliances such as microwave ovens, refrigerators, televisions, VCRs, and stereos. Furthermore, microcontrollers may also be found within computer equipment such as laser printers, modems, and disk drives. Additionally, microcontrollers may be found within automobiles (e.g., engine control, diagnostics, climate control), environmental control devices (e.g., greenhouse, factory, home), aerospace, and thousands of other uses.

It should be understood that microcontrollers may be fabricated to provide particular functionality. As such, there are many different microcontrollers for many different functions. However, there is also an advanced microcontroller which includes one or more programmable logic blocks which enable the microcontroller to be specifically programmed to perform different functions. As such, an advanced microcontroller with programmable logic blocks is typically able to be utilized for a wider variety of different applications than a customized microcontroller.

There are different ways to implement programmable logic blocks within a microcontroller. For example, the Field Programmable Gate Array (FPGA) has become very popular in recent years, even being utilized in several microcontroller applications. One reason for its popularity is the shortage in design cycle time that may be achieved by using programmable devices. Furthermore, FPGAs can be programmed to realize different digital functions. In particular, many FPGAs have programmable look-up tables to realize different digital functions. Usually, a FPGA contains from a few to tens of thousands of programmable logic blocks and an even greater number of flip-flops, each programmable logic block having a look-up table, multiplexers, and flip-flops. Therefore, by using programmable logic blocks within a microcontroller, the microcontroller may be programmed so that it can be utilized for a wide variety of different applications.

However, there are disadvantageous associated with microcontrollers that include one or more programmable logic blocks. For example, the clocking functionality of a microcontroller is typically customized to support specific functions in order to satisfy the circuit needs of a microcontroller customer. Consequently, the range of functionality of the programmable logic blocks may be restricted by such customization.

SUMMARY OF THE INVENTION

Accordingly, a need exists for a system and method for providing a wide variety of different clocking signal frequencies to one or more programmable logic blocks of a microcontroller thereby enabling them to perform a wider variety of functionality and applications. The present invention provides a method and system which accomplishes the above mentioned need.

For example, one embodiment of the present invention is a programmable clock architecture for a microcontroller that provides multiple different clocking signal frequencies that may be utilized by one or more programmable logic blocks of the microcontroller. In this manner, the clocking architecture enables the programmable logic blocks to perform a wider variety of functions because they have access to a wider variety of clock signal frequencies. Specifically, the clocking architecture of the present embodiment includes a plurality of clocking sources. For example, the output clocking signal of one of the clock oscillators is divided down to different smaller frequencies and also multiplied to provide more frequencies that may be utilized by the programmable circuit blocks and processor of the microcontroller. Additionally, the clocking architecture includes a programmable option of utilizing precision clocking signals and/or less precise clocking signals depending on the desired applications of the microcontroller's programmable circuit blocks.

In another embodiment, the present invention includes a clock architecture in a microcontroller having a microprocessor and programmable logic. The clock programmable circuit. It should be understood that the programmable circuit generates a plurality of programmable clock signals, one for the microprocessor.

The present invention provides these advantages and others which will no doubt become obvious to those of ordinary skill in the art after having read the following detailed description of embodiments in accordance with the present invention. architecture includes a first internal clock oscillator circuit. Furthermore, the clock architecture includes an oscillator support circuit that functions as a clock oscillator when a crystal is coupled to the oscillator support circuit. The clock architecture also includes a programmable switch for selectively switching a clock signal line between the first internal clock oscillator circuit and the oscillator support circuit. It should be appreciated that the clock signal line is coupled to a circuit of the microcontroller. Additionally, the clock architecture includes a second internal clock oscillator circuit for providing a programmable circuit. It should be understood that the programmable circuit generates a plurality of programmable clock signals, one for the microprocessor.

In yet another embodiment, the present invention includes a method for providing a plurality of clock signals in a microcontroller having a microprocessor and programmable logic. The method includes the action of providing a first internal clock oscillator circuit. Additionally, the method includes the action of providing an oscillator support circuit that functions as a clock oscillator when a crystal is coupled to the oscillator support circuit. Within the present embodiment, the first internal clock oscillator circuit and the oscillator support circuit are for outputting a clock signal having a substantially similar frequency. Furthermore, the method includes the action of selectively switching a clock signal line between the first internal clock oscillator circuit and the oscillator support circuit. It should be appreciated that the clock signal line is coupled to a circuit of the microcontroller. Moreover, the method includes the action of providing a second internal clock oscillator circuit for outputting to a

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
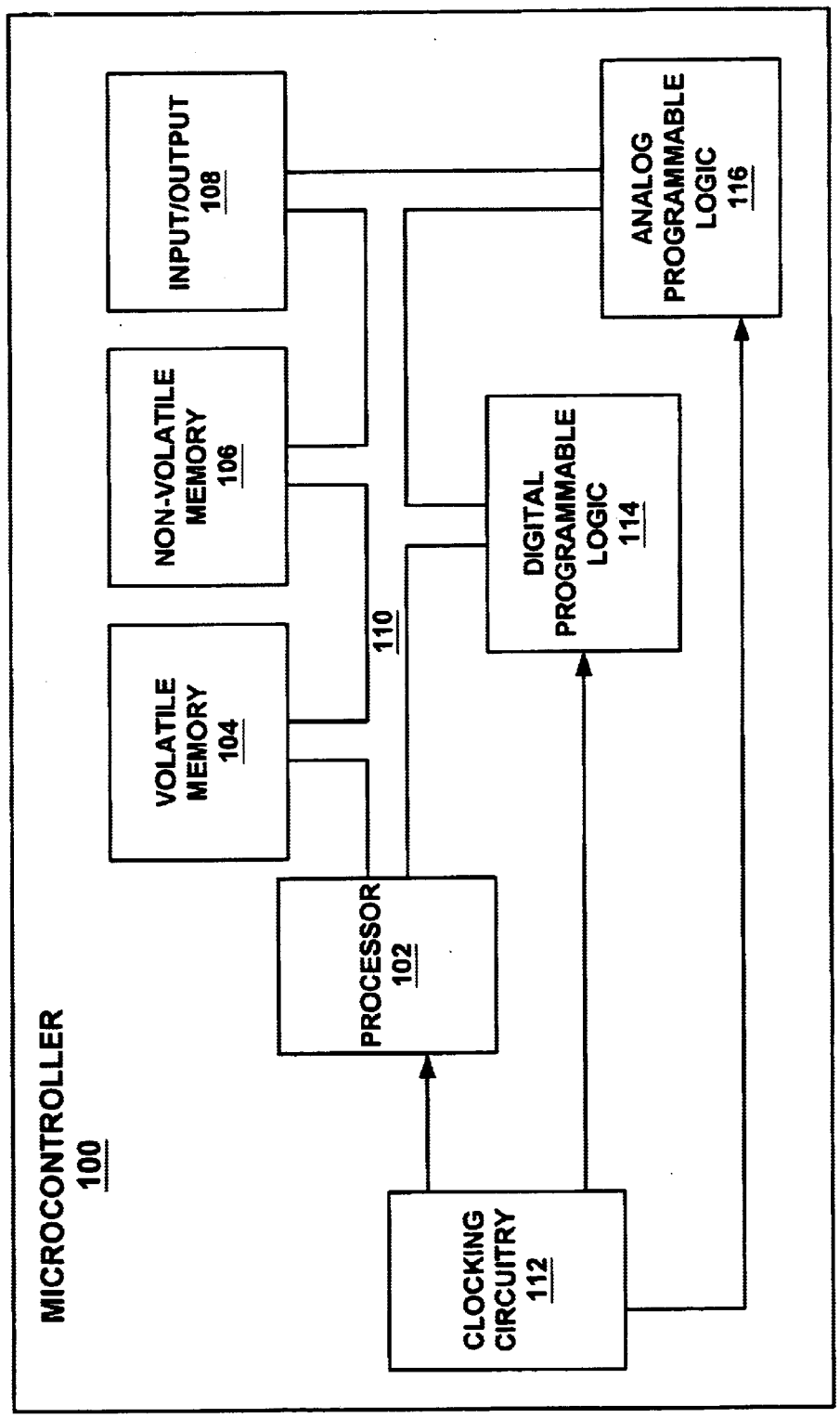
FIG. 1 is a block diagram of an exemplary microcontroller used in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a microcontroller or similar electronic computing device. These descriptions and representations are the means used by those skilled in the art to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a microcontroller or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "retrieving" or "determining" or "controlling" or "switching" or "transmitting" or "providing" or "establishing" or "generating" or "utilizing" or "storing" or "outputting" or the like, refer to the action and processes of a microcontroller, or similar electronic computing device, that manipulates and transforms data. The data is represented as physical (electronic) quantities within the microcontroller's registers and memories and is transformed into other data similarly represented as physical quantities within the microcontroller's memories or registers or other such information storage or transmission device.

EXEMPLARY HARDWARE IN ACCORDANCE WITH THE PRESENT INVENTION

FIG. 1 is a block diagram of an exemplary microcontroller 100 used in accordance with of one embodiment of the present invention. It is appreciated that microcontroller 100 may be used in control-oriented applications that are interrupt-driven, sensing and controlling external events. However, microcontroller 100 of the present embodiment may be utilized in a wide variety of devices and applications. Within the following discussions of the present invention, certain processes and steps are discussed that are realized, in one embodiment, as a series of instructions (e.g., software program) that reside within readable memory units of microcontroller 100 and executed by processor(s) of controller 100. When executed, the instructions cause microcontroller 100 to perform specific actions and exhibit specific behavior which is described in detail herein.

The microcontroller 100 of FIG. 1 may be utilized in accordance with an embodiment of the present invention and it comprises an address/data bus 110 for communicating information, one or more central processors 102 coupled with bus 110 for processing information and instructions. The central processor unit 102 may be a microprocessor or any other type of processor. The microcontroller 100 also includes data storage features such as a volatile memory unit 104 (e.g., random access memory, static RAM, dynamic RAM, etc.) coupled with bus 110 for storing information and instructions for the central processor(s) 102, a non-volatile memory unit 106 (e.g., read only memory, programmable ROM, flash memory, EPROM, EEPROM, etc.) coupled with bus 110 for storing static information and instructions for the processor(s) 102.

Additionally, microcontroller 100 of FIG. 1 includes an input/output (I/O) control unit 108 coupled with bus 110 for enabling microcontroller 100 to interface with other electronic devices and systems. The input/output interface 108 of the present embodiment may include serial and/or parallel communication standards, but could also alternatively be any of a number of well known communication standards and protocols. The microcontroller 100 may include one or more optional digital programmable logic blocks 114 and/or one or more optional analog programmable logic blocks 116 which are coupled to bus 110 for enabling a software program operating on processor 102 to specifically programmed them to perform different functions. Therefore, microcontroller 100 has the ability to be utilized for a wide variety of different applications. It should be understood that the digital programmable logic block 114 and the analog programmable logic block 116 may be implemented in a wide variety of ways in accordance with the present embodiment.

For example, digital programmable logic block 114 may be implemented in a manner similar to digital Programmable System-on-Chip™ (PSoC™) blocks provided by Cypress MicroSystems of Bothell, Wash. Specifically, digital PSoC blocks are 8-bit logic blocks that can be given a personality. For example, the personality may be to act as a counter, timer, serial receiver, serial transmitter, cyclic redundancy correction (CRC) generator, pseudo-random number generator, SPI (serial peripheral interface) Master or SPI Slave. The digital PSoC blocks may also be interconnected to perform more complex functions. For example, by connecting digital PSoC blocks in parallel, 8-bit timers and counters can be extended to 16-, 24- or 32-bit functions. Furthermore, by combining a serial receiver and a transmitter to create a UART (universal asynchronous receiver-transmitter). Additionally, by connecting digital PSoC blocks serially supports functions such as directly connecting a CRC generator to a serial transmitter thereby reducing programming impact and increasing performance. These are just some of the examples of the ways digital PSoC blocks may be utilized in accordance with the present embodiment.

On the other hand, analog programmable logic block 116 of FIG. 1 may be implemented in a manner similar to analog PSoC™ blocks provided by Cypress MicroSystems of Bothell, Wash. Specifically, analog PSoC blocks are programmable operational amplifier (op-amp) circuits. Additionally, there are switch capacitor (SC) and continuous time (CT) blocks. These blocks can be interconnected and personalized to provide analog to digital converters (ADCs), digital to analog converters (DACs), multi-pole filters, gain stages, and much more. As with digital PSoC blocks, analog PSoC blocks may be connected in parallel or serial. Parallel connection of analog PSoC blocks increases precision of the function. A single analog PSoC block provides a 6-bit DAC. Two analog PSoC blocks provide a 10-bit DAC. Serial connection is one of the real benefits of the PSoC block technology. A serial signal may be brought on to the chip and then routed through the necessary analog functions to condition the signal before digital conversion. Filtering may be switched in or out, and scaling may be modified based upon the values discovered. In addition, because analog PSoC blocks are based upon fundamental op-amp circuits, many other functions may be created.

The microcontroller 100 of FIG. 1 also includes clocking circuitry 112 which is coupled to the processor 102, digital programmable logic block 114 and analog programmable logic block 116 for providing clocking signals. It should be appreciated that the clocking architecture 112 is able to provided a wide variety of clocking signal frequencies to the different circuitry that it is coupled to. The clocking architecture 112 is discussed in greater detail herein.

Figure 2:
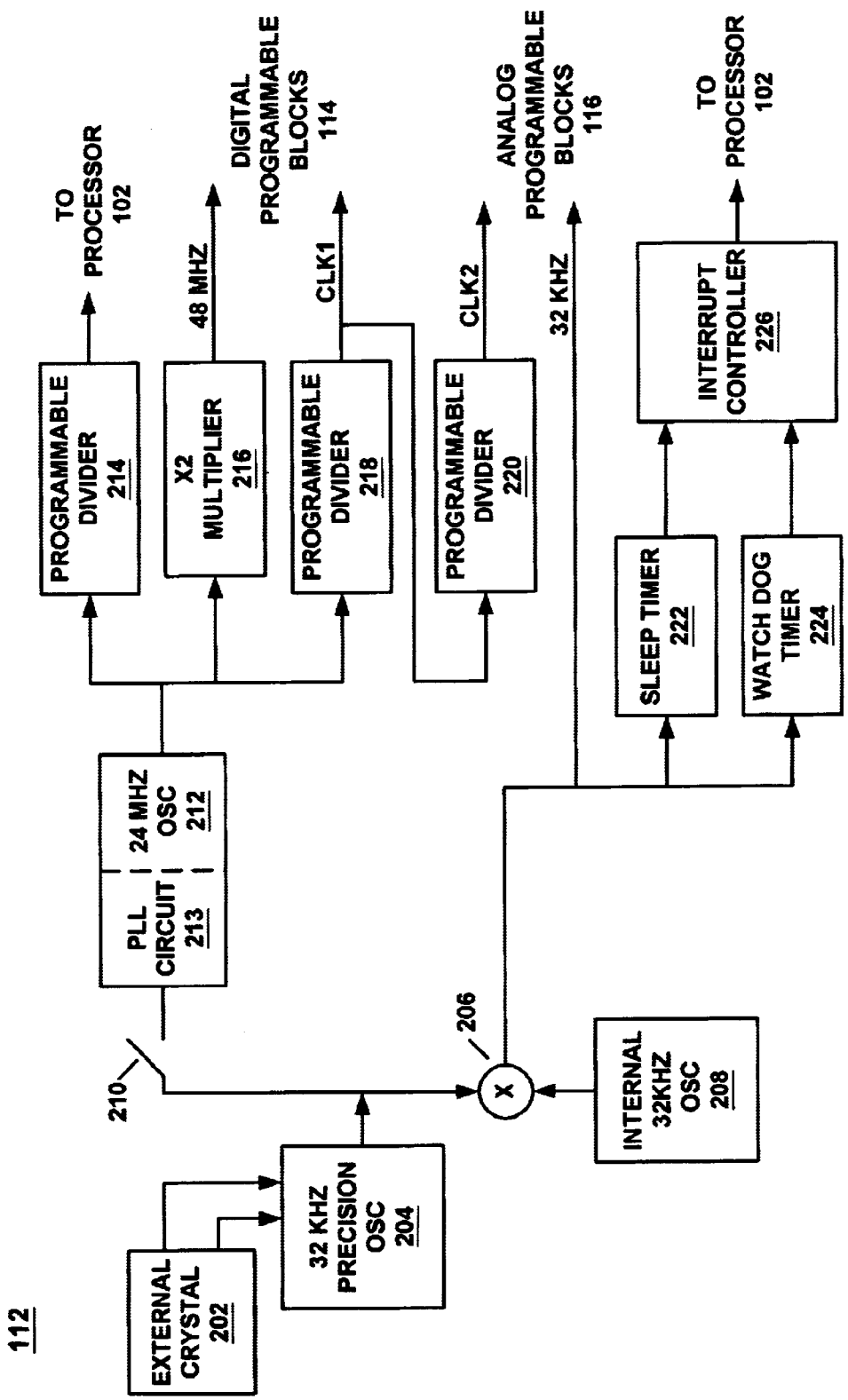
FIG. 2 is a block diagram of an exemplary clocking architecture in accordance with an embodiment of the present invention for a microcontroller.

FIG. 2 is a block diagram of an exemplary clock architecture 112 in accordance with an embodiment of the present invention for a microcontroller (e.g., 100). Within the present embodiment, the programmable clock architecture 112 provides multiple different clocking signal frequencies that may be utilized by one or more programmable logic blocks (e.g., 114 and/or 116) of the microcontroller 100. In this manner, the clocking architecture 112 enables the programmable logic blocks (e.g., 114 and/or 116) to perform a wider variety of functions because they have access to a wider variety of clock signal frequencies. Specifically, the clocking architecture 112 of the present embodiment includes a plurality of clocking sources. For example, the output clocking signal of a 24 megahertz (MHz) oscillator 212 is divided down to different smaller frequencies and also multiplied to provide more frequencies that may be utilized by the programmable circuit blocks (e.g., 114 and/or 116) and the processor 102 of the microcontroller 100. It should be appreciated that oscillator 212 does not have to be a fixed frequency oscillator, but instead may be a variable oscillator designed to operate over a range of frequencies and thus provide an even greater flexibility in the clock generator circuit 112. Additionally, the clocking architecture 112 includes a programmable switch 206 which provides a programmable option of utilizing precision clocking signals and/or less precise clocking signals depending on the desired applications of the programmable circuit blocks (e.g., 114 and/or 116).

More specifically, the clock architecture 112 includes as many as three simultaneously operating clock oscillators. However, it should be appreciated that the clocking architecture 112 of the present embodiment is well suited to have any amount of oscillators. Within the present embodiment, the clocking architecture 112 includes a 32 kilohertz (kHz) precision oscillator (OSC) 204, an internal 32 kHz oscillator 208 and 24 MHz oscillator 212. However, it should be understood that the 32 kHz precision oscillator 204 is not operational unless an external crystal 202 is coupled to it. That is, the 32 kHz precision oscillator 204 includes the oscillator circuitry that supports the external crystal 202. The clock architecture 112 also includes programmable switch 206 that is coupled to the outputs of the 32 kHz precision oscillator 204 and the internal 32 kHz oscillator 208. As such, the programmable switch 206 provides the programmable option of utilizing precise clocking signals and/or less precise clocking signals depending on the desired applications of the microcontroller 100. In this manner, the clock architecture 112 provides a larger variety of flexibility with the clocking signals that may be utilized by the different components of the microcontroller 100.

Moreover, within an embodiment in accordance with the present embodiment, if the external crystal 202 is coupled to the 32 kHz precision oscillator 204, the programmable switch 206 may be coupled to the output of the 32 kHz precision oscillator 204 and the internal 32 kHz oscillator 208 may be deactivated in order to save power. Conversely, if the external crystal 202 is not coupled to the 32 kHz precision oscillator 204, the programmable switch 206 is coupled to the output of the internal 32 kHz oscillator 208 and the 32 kHz precision oscillator 204 remains inactive. In this manner, the circuitry of the clock architecture 112 is selectable. However, the clock architecture 112 of the present embodiment is well suited to have both the 32 kHz precision oscillator 204 and the internal 32 kHz oscillator 208 operating simultaneously.

Additionally, within the clock architecture 112 of FIG. 2, the internal 32 kHz oscillator 208 may be utilized to maintain background activity and achieve minimum supply current consumption since a typical internal oscillator runs constantly. Furthermore, analog sampling may also occur utilizing the internal 32 kHz oscillator 208 in order to maintain internal references during a sleep or power down mode. It should be appreciated that the 32 kHz precision oscillator 204 may be utilized for this purpose if it has been activated by coupling the external crystal 202 to it. However, one of the advantages of utilizing the internal 32 kHz oscillator 208 (instead of the 32 kHz precision oscillator 204) is that it does not utilize as much circuit board space because it does not involve an external crystal (e.g., 202).

The clocking architecture 112 also includes the 24 MHz oscillator 212 which may be implemented with a precision integrated circuit (IC) oscillator. For example, the normal mode of operation for the 24 MHz oscillator 212 may have a tolerance of +/−2%. Furthermore, when a programmable switch 210 is closed, the 24 MHz oscillator 212 includes a phase lock loop (PLL) circuit 213 which enables it to phase lock onto the precision clocking signal output by the 32 kHz precision oscillator 204 (when activated). In this fashion, the 24 MHz oscillator 212 has an optional feature for performing frequency precision applications of the microcontroller 100. It should be appreciated that the PLL circuit 213 may be variable PLL circuit designed to operate over a range of input frequencies and that the 32 kHz precision oscillator 204 may be designed to operate with crystals (e.g., 202) of a number of different frequencies. It should be pointed out that within the present embodiment, all of the internal and external events of the microcontroller 100 are synchronized to the 24 MHz oscillator 212.

Specifically, within the clock architecture 112 of FIG. 2, the output of the 32 kHz precision oscillator 204 is also coupled to the programmable switch 210 which is coupled to the PLL circuitry 213 of the 24 MHz oscillator 212. If the external crystal 202 is coupled to the 32 kHz precision oscillator 204, the programmable switch 210 may be optionally closed thereby enabling the PLL circuitry 213 to phase lock the 24 MHz oscillator 212 to the precise clocking signal output by the 32 kHz precision oscillator 204. However, when the programmable switch 210 is open, the PLL circuitry 213 is inactive but the 24 MHz oscillator 212 continues to output a 24 MHz clocking signal.

The output of the 24 MHz oscillator 212 is coupled to a programmable divider circuit 214, a times two (×2) multiplier circuit 216, and an optional programmable divider circuit 218. Additionally, the output of the programmable divider circuit 218 is coupled to the input of an optional programmable divider circuit 220. It should be understood that the programmable divider circuits 214, 218 and 220 of the present embodiment may be programmed to output a wide variety of different frequencies. For example, the programmable divider circuit 214 may be programmed to output a clocking signal having a frequency range of 93 kHz to 24 MHz. Within the present embodiment, the programmable divider 214 is coupled to output to the processor 102. However, the multiplier 216 and programmable dividers 218 and 220 may be coupled to provide clocking signals to the digital programmable circuit blocks 114 and/or the analog programmable circuit blocks 116. Additionally, multiplier 216 receives the 24 MHz clocking signal from the 24 MHz oscillator 212 and multiplies it by 2 in order to output a 48 MHz clocking signal while programmable dividers 218 and 220 output clocking signals CLK1 and CLK2, respectively. It is appreciated that the multiplier circuit 216 of the present embodiment is well suited to multiply a received clocking signal by any amount to produce an increased frequency output clocking signal. Moreover, the multiplier circuit 216 may be implemented in a wide variety of ways in accordance with the present embodiment. For example, the multiplier circuit 216 may be implemented utilizing a delay lock loop (DLL) circuit.

Within FIG. 2, the output of programmable switch 206 is coupled to an input of a watch dog timer circuit 224 and a sleep timer circuit 222. Additionally, the output of programmable switch 206 may be also coupled to provide a 32 kHz clocking signal to the digital programmable circuit blocks 114 and/or the analog programmable circuit blocks 116. The output of sleep timer 222 and the output of the watch dog timer 224 are coupled to an interrupt controller 226 which is coupled to output interrupt signals to the processor 102.

The sleep timer 222 of the present embodiment may provide the processor 102 (via interrupt controller 226) an interrupt signal at a selectable rate. For example, the rate of the sleep timer 222 may be selected from four fixed choices, e.g., 2 milliseconds (ms), 16 ms, 125 ms, or 1 second. The sleep timer 222 may also be utilized to periodically wake up the processor 102 from its sleep or power down mode. Furthermore, the sleep timer 222 may be used as a general purpose low frequency rate generator for the processor 102. The sleep timer 222 of the present embodiment is dedicated to the processor 102 and it is programmable (it does not require any personalization). It should be understood that when the sleep timer 222 is driven by the 32 kHz precision oscillator 204, it forms the basis for a real time clock function.

Within the present embodiment, one of the purposes of the watch dog timer 224 is to reset the operations of the processor 102 when its software program is no longer functioning properly. Specifically, the software program operating on processor 102 has to reset the watch dog timer 224 at a predefined time interval. However, if the software program fails to reset the watch dog timer 224 for some reason (e.g., it crashed), the watch dog timer 224 outputs a watch dog interrupt to the processor 102 (via the interrupt controller 226) thereby causing processor 102 and its software program to be reset and reboot.

As illustrated in FIG. 2, the programmable clock architecture 112 of microcontroller 100 provides multiple different clocking signal frequencies that may be utilized by processor 102 along with one or more programmable logic blocks (e.g., 114 and/or 116) of the microcontroller 100. In this manner, the clocking architecture 112 enables the programmable logic blocks (e.g., 114 and/or 116) to perform a wider variety of functions and applications because they have access to a wider variety of clock signal frequencies.

Exemplary Operations in Accordance with the Present Invention

Figure 3:
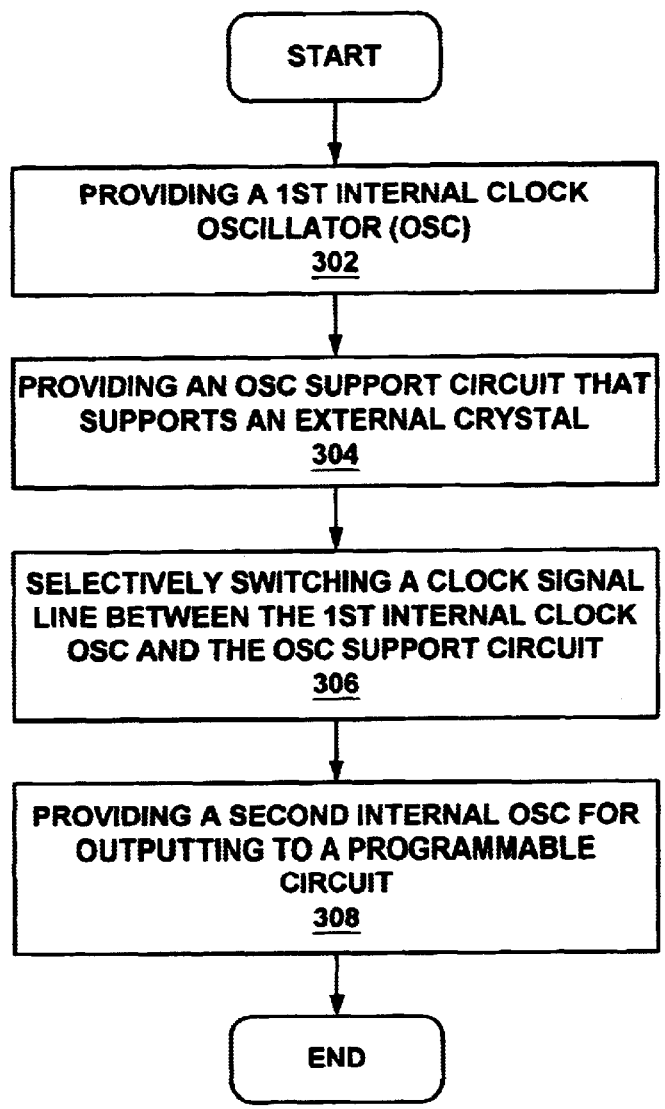
FIG. 3 is a flowchart of steps performed in accordance with one embodiment of the present invention for providing a plurality of clock signals in a microcontroller having a microprocessor and programmable logic.

FIG. 3 is a flowchart 300 of steps performed in accordance with one embodiment of the present invention for providing a plurality of clock signals in a microcontroller (e.g., 100) having a microprocessor (e.g., 102) and programmable logic (e.g., 114 and/or 116). Flowchart 300 includes processes of the present invention which, in one embodiment, are carried out by a processor and electrical components under the control of readable and executable instructions. The readable and executable instructions reside, for example, in data storage features such as volatile memory 104 and/or non-volatile memory 106 of FIG. 1. However, the readable and executable instructions may reside in any type of readable medium. Although specific steps are disclosed in flowchart 300, such steps are exemplary. That is, the present invention is well suited to performing various other steps or variations of the steps recited in FIG. 3. Within the present embodiment, it should be appreciated that the steps of flowchart 300 may be performed by software, by hardware, or by any combination of software and hardware.

At step 302, the present embodiment provides a first internal clock oscillator circuit (e.g., 208). It is understood that the. first internal clock oscillator is well suited to output a clock signal having any frequency. In step 304, the present embodiment provides an oscillator support circuit (e.g., 204) that functions as a clock oscillator when a crystal (e.g., 202) is coupled to the oscillator support circuit. If activated by the coupled crystal, the oscillator support circuit is well suited to output a precision clock signal having any frequency. Within one embodiment, the first internal clock oscillator circuit and the oscillator support circuit are implemented to each output a clock signal having a substantially similar frequency.

In step 306 of FIG. 3, the present embodiment selectively switches a clock signal line between the first internal clock oscillator circuit (e.g., 208) and the oscillator support circuit (e.g., 204). It should be pointed out that the clock signal line of step 306 is coupled to a circuit of the microcontroller (e.g., 100). Within an embodiment in accordance with the present invention, if a crystal is coupled to the oscillator support circuit, the first internal clock oscillator circuit may be deactivated and the clock signal line is selectively switched to couple to the oscillator support circuit. However, if a crystal is not coupled to the oscillator support crystal, the internal clock oscillator circuit remains active and the clock signal line is selectively switched to couple to the internal clock oscillator circuit. It should be understood that both the internal clock oscillator circuit and the oscillator support circuit coupled to a crystal may be active simultaneously. Within step 306, the circuit that is coupled to the clock signal line may include the programmable logic (e.g., 114 and/or 116), a sleep timer (e.g., 222), a watch dog timer (e.g., 224), the processor (e.g., 102) and/or any other type of circuit.

At step 308, the present embodiment provides a second internal clock oscillator circuit (e.g., 212) for outputting to a programmable circuit (e.g., 214 and/or 218). It should be understood that the programmable circuit generates a plurality of programmable clock signals and one of them may be received by the microprocessor (e.g., 102) and/or the programmable logic (e.g., 114 and/or 116). Once step 308 is completed, the present embodiment exits flowchart 300.

Accordingly, the present invention provides a system and method for providing a wide variety of different clocking signal frequencies to one or more programmable logic blocks of a microcontroller thereby enabling them to perform a wider variety of functionality and applications.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a microcontroller having a microprocessor and programmable logic, a clock architecture comprising:
   a first internal clock oscillator circuit;
   an oscillator support circuit that functions as a clock oscillator when a crystal is coupled to said oscillator support circuit;
   a programmable switch for selectively switching a clock signal line between said first internal clock oscillator circuit and said oscillator support circuit, wherein said clock signal line is coupled to a circuit of said microcontroller; and
   a second internal clock oscillator circuit for providing a programmable circuit, wherein said programmable circuit generates a plurality of programmable clock signals, one for said microprocessor.

2. The clock architecture as described in claim 1 further comprising:
   a multiplier circuit coupled to said second internal clock oscillator circuit for generating an increased frequency clock signal.

3. The clock architecture as described in claim 1 wherein said second internal clock oscillator circuit comprises a phase lock loop circuit for receiving a clock signal from said oscillator support circuit.

4. The clock architecture as described in claim 3 wherein said phase lock loop circuit comprises a variable phase lock loop circuit.

5. The clock architecture as described in claim 1 wherein said circuit comprises said programmable logic.

6. The clock architecture as described in claim 1 wherein said circuit comprises a sleep timer.

7. The clock architecture as described in claim 1 wherein said circuit comprises a watch dog timer.

8. The clock architecture as described in claim 1 wherein said programmable logic is coupled to receive one of said plurality of programmable clock signals generated by said programmable circuit.

9. The clock architecture as described in claim 1 wherein said first internal clock oscillator circuit and said oscillator support circuit for outputting a clock signal having a substantially similar frequency.

10. The clock architecture as described in claim 1 wherein said second internal clock oscillator circuit comprises a variable oscillator circuit.

11. In a microcontroller having a microprocessor and programmable logic, a clock architecture comprising:

a first internal clock oscillator circuit;

an oscillator support circuit that functions as a clock oscillator when a crystal is coupled to said oscillator support circuit, wherein said first internal clock oscillator circuit and said oscillator support circuit for outputting a clock signal having a substantially similar frequency;

a programmable switch for selectively switching a clock signal line between said first internal clock oscillator circuit and said oscillator support circuit, wherein said clock signal line is coupled to a circuit of said microcontroller; and a second internal clock oscillator circuit for providing a first programmable divider circuit, wherein said first programmable divider circuit generates a first programmable clock signal for said microprocessor.

12. The clock architecture as described in claim 11 further comprising:

a multiplier circuit coupled to said second internal clock oscillator circuit for generating an increased frequency clock signal.

13. The clock architecture as described in claim 11 wherein said second internal clock oscillator circuit comprises a phase lock loop circuit for receiving a clock signal from said oscillator support circuit.

14. The clock architecture as described in claim 13 wherein said phase lock loop circuit comprises a variable phase lock loop circuit.

15. The clock architecture as described in claim 11 wherein said circuit comprises said programmable logic.

16. The clock architecture as described in claim 11 wherein said circuit comprises a sleep timer.

17. The clock architecture as described in claim 11 wherein said circuit comprises a watch dog timer.

18. The clock architecture as described in claim 11 further comprising:

a second programmable divider circuit coupled to said second internal clock oscillator circuit for generating a second programmable clock signal for said programmable logic.

19. The clock architecture as described in claim 11 wherein said second internal clock oscillator circuit comprises a variable oscillator circuit.

20. A method for providing a plurality of clock signals in a microcontroller having a microprocessor and programmable logic, said method comprising:

providing a first internal clock oscillator circuit;

providing an oscillator support circuit that functions as a clock oscillator when a crystal is coupled to said oscillator support circuit, wherein said first internal clock oscillator circuit and said oscillator support circuit for outputting a clock signal having a substantially similar frequency;

selectively switching a clock signal line between said first internal clock oscillator circuit and said oscillator support circuit, wherein said clock signal line is coupled to a circuit of said microcontroller; and providing a second internal clock oscillator circuit for outputting to a programmable circuit, wherein said programmable circuit generates a plurality of programmable clock signals, one for said microprocessor.

21. The method as described in claim 20 further comprising:

in response to said crystal being coupled to said oscillator support circuit, deactivating said first internal clock oscillator circuit.

22. The method as described in claim 20 further comprising:

in response to said crystal not being coupled to said oscillator support circuit, selectively switching said clock signal line to said first internal clock oscillator circuit.

23. The method as described in claim 20 further comprising:

receiving a clock signal from said second internal clock oscillator circuit and generating a n increased frequency clock signal.

24. The method as described in claim 20 further comprising:

in response to said crystal being coupled to said oscillator support circuit, locking said second internal clock oscillator circuit to a clock signal output by said oscillator support circuit.

25. The method as described in claim 20 wherein said circuit comprises said programmable logic.

26. The method as described in claim 20 wherein said circuit comprises a sleep timer.

27. The method as described in claim 20 wherein said circuit comprises a watch dog timer.

28. The method as described in claim 20 wherein said programmable logic is coupled to receive one of said plurality of programmable clock signals generated by said programmable circuit.

29. The method as described in claim 20 wherein said second internal clock oscillator circuit comprises a variable oscillator circuit.

* * * * *